United States Patent [19]

Kaneda et al.

[11] 4,373,087
[45] Feb. 8, 1983

[54] O-TOLIDINE SULFONE BASED COPOLYAMIDE FIBER

[75] Inventors: Takaho Kaneda, Chiba; Seiji Ishikawa, Ichihara; Hiroshi Daimon, Ichihara; Toshio Katsura, Ichihara; Tadahiro Hondo, Ichihara; Masahiro Ueda, Ichihara, all of Japan

[73] Assignee: UBE Industries Ltd., Yamaguchi, Japan

[21] Appl. No.: 243,423

[22] Filed: Mar. 13, 1981

Related U.S. Application Data

[63] Continuation-in-part of Ser. No. 973,636, Dec. 27, 1978, abandoned.

[30] Foreign Application Priority Data

Jan. 6, 1978 [JP] Japan .................................... 53-282

[51] Int. Cl.³ .............................................. C08G 69/32
[52] U.S. Cl. ................................ 528/337; 264/176 F; 528/336; 528/340; 528/341; 528/347
[58] Field of Search ............................... 528/337, 340
[56] References Cited

U.S. PATENT DOCUMENTS 3,467,623  9/1969  Hinderer et al. ..................... 528/337
4,178,431  12/1979  Kaneda et al. ....................... 528/337

Primary Examiner—Harold D. Anderson
Attorney, Agent, or Firm—Sherman & Shalloway

[57] ABSTRACT

A novel copolyamide fiber having an excellent initial modulus of elasticity and mechanical strength, is made from a copolyamide consisting essentially of unit A of the formula (A):

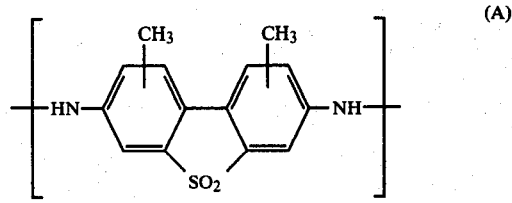

unit (B) of the formula (B):

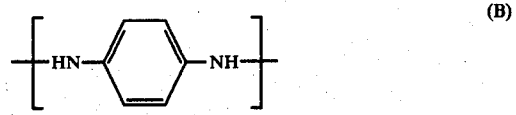

and unit (C) of the formula (C):

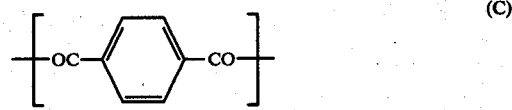

wherein $CH_3$ groups in the formula (A) are located in the ortho-position to NH groups, the sum of the amount of units (A) and (B) is substantially equimolar to the amount of unit (C) and the molar ratio of unit (A) to unit (B) is from 10/90 to 50/50.

5 Claims, 1 Drawing Figure

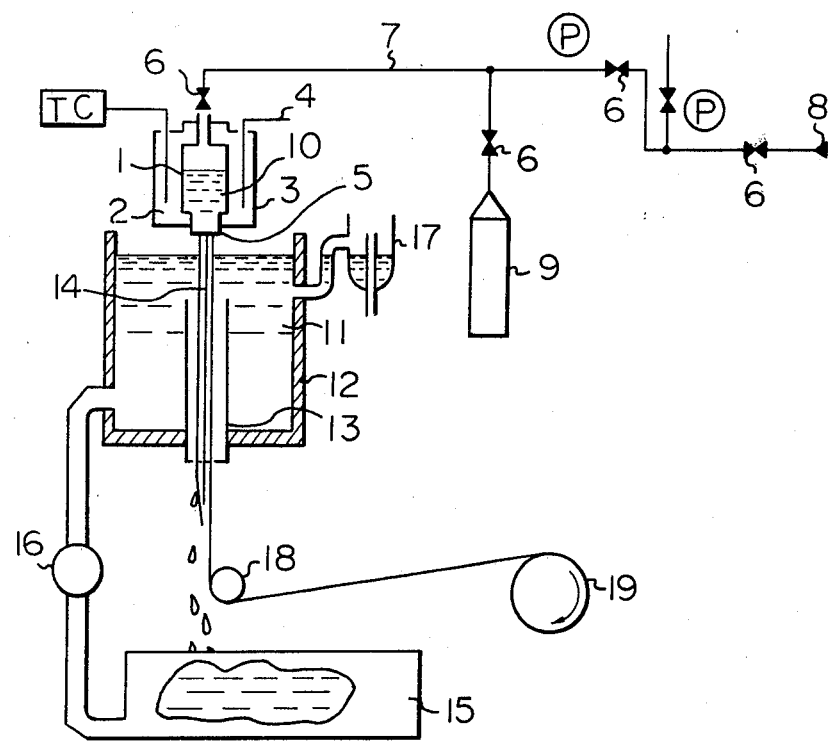

O-TOLIDINE SULFONE BASED COPOLYAMIDE FIBER

The present application is a continuation-in-part of U.S. patent application Ser. No. 973,636 which was filed on Dec. 27, 1978, and now abandoned.

BACKGROUND OF THE INVENTION

The present invention relates to novel copolyamide fibers having an excellent initial modulus of elasticity and mechanical strength.

U.S. Pat. No. 4,178,431 for T. Kaneda et al, discloses a fiber composed of a high molecular weight copolyamide which is a copolymerization product of a diamine component consisting of a mixture of benzidine sulfone and p-phenyldiamine with a dicarboxylic component consisting of terephthalic acid or its reactive derivative. This type of copolyamide fiber exhibits an excellent initial modulus of elasticity and mechanical strength. However, the fiber is disadvantageous in that the copolyamide from which the fiber has been made, contains, as a portion of the diamine component, benzidine sulfone which per se is mutagenic and, also, which has been usually prepared from benzidine that is carcinogenic. That is, benzidine is not allowed to be industrially used for producing benzidine sulfone, and also, using benzidine sulfone for producing the copolyamide should be avoided.

Under the above-mentioned circumstances, it was strongly desired to provide a new type of aromatic copolyamide fiber which exhibits an excellent initial modulus of elasticity and mechanical strength similar to those of the benzidine sulfone-containing copolyamide fiber and which can be prepared by using a diamine component which is neither mutagenic nor carcinogenic.

SUMMARY OF THE INVENTION

An object of the present invention is to provide a fiber composed of a high molecular weight copolyamide which can be prepard by using a non-mutagenic diamine component, the fiber having an excellent initial modulus of elasticity and mechanical strength.

The above-mentioned object can be attained by the fiber of the present invention which is composed of a high-molecular-weight copolyamide consisting essentially of units (A) represented by the following formula:

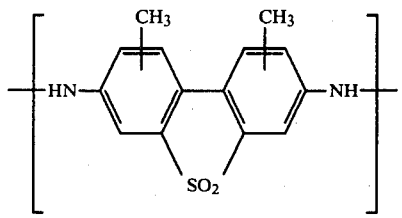

wherein the two methyl groups are bonded at the ortho-position to the NH groups, units (B) represented by the following formula:

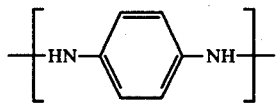

and units (C) represented by the following formula:

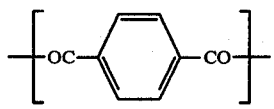

in which the units (A), (B) and (C) are present in such amounts that the sum of the amounts of units (A) and (B) is substantially equimolar to the amount of the units (C) and the molar ratio of the units (A) to the units (B) is in the range of from 10/90 to 50/50.

DETAILED DESCRIPTION OF THE INVENTION

In the fiber of the present invention, it is essential that the fiber is made from the specific aromatic copolyamide consisting essentially of a diamine ingredient consisting of units (A), and units (B) and a dicarboxylic ingredient consisting of units (C) as defined hereinbefore, and the sum of the amount of the units (A) and (B) is substantially equimolar to the amount of the units (C) and the molar ratio of the units (A) to the units (B) is in the range of from 10/90 to 50/50, preferably from 15/85 to 30/70. Especially, it is important that the units (A) are derived from o-tolidine sulfone which is non-mutagenic.

Usually, o-tolidine sulfone is prepared by reducing o-nitrotoluene in an aqueous solution of ethanol with metallic zinc and sodium hydroxide to provide o-hydrazotoluene;

subjecting the resultant o-hydrazotoluene to a benzidine arrangement procedure to prepare o-tolidine;

converting the resultant o-tolidine to a sulfate thereof, and;

finally, sulfonating the sulfate with fuming sulfuric acid to provide o-tolidine sulfone.

The resultant o-tolidine sulfone consists of a mixture of three isomers represented by the following formulae:

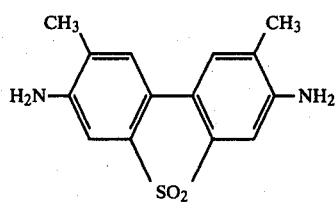

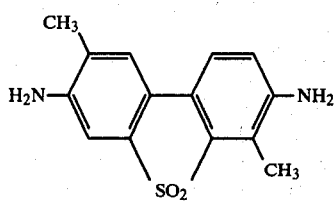

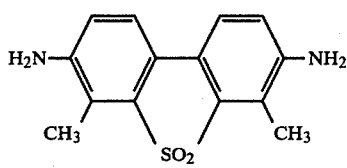

In each isomer, the methyl groups are located at ortho-positions to the amino groups.

Accordingly, in the unit A represented by the formula:

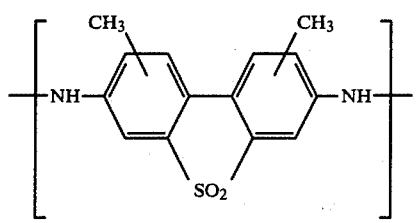

each of the two methyl groups is located at the ortho-position to the corresponding-NH group.

Also, it should be noted that the fiber of the present invention can exhibit an excellent initial modulus of elasticity of, for example, from 400 g/d to 875 g/d and a superior tensile strength of, for example, 16 to 35 g/d. The levels of the initial modulus of elasticity and the tensile strength of the fiber of the present invention are similar to those of the copolyamide fiber disclosed in the U.S. Pat. No. 4,178,431.

As stated above, o-tolidine sulfone is non-mutagenic. This feature of o-tolidine sulfone was proved by the following test.

o-tolidine sulfone was subjected to an Ames test (mutagenicity test) in which the microorganism used was Salmonella typhimurium TA-100.

The Ames test for o-tolidine sulfone was conducted according to the following procedures.

A culture medium which had been prepared by mixing 2% of glucose and 1.5% of agar to Vogel-Bonner E medium was applied onto a plate in an amount of 30 ml per plate.

To a 0.6% aqueous solution of sodium chloride was added 0.8% of agar, and 10 ml of a liquid of mixture of 0.5 mM of histidine with 0.5 mM of biotin was added to 100 ml of the above solution to form an upper layer agar. Then, 2 ml of the upper layer was charged in a test tube and maintained at 45° C., and 0.1 ml of a solution of 50 mg of o-tolidine sulfone (TS) in 1 ml of dimethyl sulfoxide (DMSO) was added and 0.1 ml of a bacterium liquid cultured overnight was further added. Then, 0.2 ml of S-9 (prepared from a liver homogenate of a male rat of the SD series; Ames, B. N., J. Mc Cann, et al., Mutation Res., 31, 347-364 (1975)) was added to the charge of the test tube. Immediately, the test tube was shaken and the mixture was overlaid on the culture medium on the plate. The above-mentioned procedures were repeated twice to prepare two test plates.

Culturing was conducted at 37° C. for about 45 hours, and the number of the resultant colonies was counted. A mean value was calculated from the colony numbers of the two plates. If the colony number was at least two times the colony number at the control test, it was judged that the sample was mutagenic. For the purpose of comparison, the same procedures as those described above were carried out for benzidine sulfone (BS), 2,7-diamino phenanthridone (DAP) and p-phenylene diamine.

The obtained results are shown in Table 1.

TABLE 1

| Results of Mutagenicity Test Using S. typhimurium TA-100 | | |
|---|---|---|
| Compound | Concentration (μg/plate) | Judgement |
| Benzidine Sulfone (BS) | 2500 | positive |
| Benzidine Sulfone (BS) | 1250 | positive |
| o-Tolidine Sulfone (TS) | 2500 | negative |
| o-Tolidine Sulfone (TS) | 1250 | negative |
| 2,7-Diamino phenanthridone (DAP) | 500 | positive |
| 2,7-Diamino phenanthridone (DAP) | 250 | positive |
| p-Phenylene Diamine | 1000 | negative |
| p-Phenylene Diamine | 500 | negative |

From Table 1, it is clear that θ-tolidine sulfone is unexpectedly non-mutagenic whereas benzidine sulfone and 2,7-diaminophenanthridone are mutagenic. Also, p-phenylene diamine is non-mutagenic. Therefore, the diamine component usable for the present invention is non-mutagenic.

The novel copolyamide usable for the present invention can be prepared by polycondensing a diamine component consisting essentially of (a) o-tolidine sulfone and (b) p-phenylene diamine with a dicarboxylic component consisting essentially of (c) terephthalic acid or its reactive derivative in an organic solvent (solution copolycondensation) while adjusting the amounts of the reactants (a), (b) and (c) so that the units (A) derived from o-tolidine sulfone and the units (B) derived from p-phenylene diamine are introduced in the resulting copolyamide at the above-mentioned molar ratio and the sum of the amounts of the units (A) and (B) is substantially equimolar to the amount of the units (C) derived from terephthalic acid.

As the reactive derivative of terephthalic acid, there may be terephthaloyl halides which are customarily used for polyamide-forming reactions.

The reaction (solution copolycondensation) between the above-mentioned diamine component and the dicarboxylic component is preferably conducted in an organic solvent. As such organic solvents, there can be mentioned, for example, amides such as N,N-dimethylacetamide, N,N-dimethyl propionamide, hexamethyl phosphoramide, N,N,N',N'-tetramethyl urea and N-methylcaprolactam, and pyrrolidone compounds such as N-methyl-2-pyrrolidone, 1,5-dimethyl-2-pyrrolidone and N-acetyl-2-pyrrolidone. Each organic solvent may be used singly or in the form of a mixture of two or more. Moreover, mixtures of the foregoing solvents with trimethylchlorosilane, triethylchlorosilane, dimethyldichlorosilane or the like may be used as a solvent for the reaction. The foregoing basic nitrogen-containing compounds, such as dimethyl acetamide and N-methyl-2-pyrrolidone, serve not only as excellent reaction media, but also as acid binders capturing hydrogen halides formed as the by-product at the copolycondensation between the diamines and terephthaloyl halide and thereby promoting the copolycondensation.

A dissolving assistant, such as lithium chloride, calcium chloride or the like, may be incorporated in the organic solvent.

In order to prepare a copolyamide having a high molecular weight, it is preferred that, as illustrated in Examples given hereinafter, purified reactants and solvents be used, so that the amounts of impurities and water present in the reaction mixture are made as small as possible, and the copolycondensation be carried out in an inert atmosphere free of water, for example, in a dried nitrogen current.

In the initial stage of the copolycondensation, it is preferred that the reaction be carried out at a temperature as low as possible, for example, at a temperature lower than 50° C.. In general, the copolycondensation is accomplished by maintaining a solution of the above-mentioned diamines in a suitable organic solvent under cooling and adding the above-mentioned reactive derivative of terephthalic acid to this solution. The foregoing two diamines may be reacted with the reactive derivative of terephthalic acid simultaneously or separately in sequence.

The copolycondensation may be conducted in a continuous manner or batchwise.

The copolyamide that is used in the present invention must have a fiber-forming molecular weight. In the present invention, the copolyamide has an inherent viscosity $\eta$ inh of at least 2.0 dl/g, preferably from 3.0 to 10 dl/g, as measured at a temperature of 30° C. in a solution in 96% sulfuric acid containing 0.5 g/dl of the polymer. The inherent viscosity $\eta$ inh referred to herein is a measured value defined by the following formula;

$$\eta \text{ inh} = \ln (\eta \text{ rel})/C$$

wherein C is a concentration of the polymer solution (g of the polymer per 100 ml of the solvent) and $\eta$ rel stands for a relative viscosity, namely the ratio of the flow times of the polymer solution and solvent as measured by a capillary viscometer.

The fiber of this invention is prepared by spinning a spinning solution containing the above-mentioned high-molecular-weight copolyamide dissolved in a solvent in a filamentary form and solidifying the spun copolyamide in the filamentary form.

As the solvent for the formation of the spinning solution, concentrated sulfuric acid is used.

The copolyamide separated and purified in the above-mentioned copolycondensation method is soluble in concentrated sulfuric acid at a relatively low temperature and provides a spinning solution having a concentration suitable for spinning, for example, a spinning solution having a copolyamide content of 15 to 25%, preferably 18 to 23%. The concentration of sulfuric acid used for the formation of the spinning solution must be at least 98%, and the amount of water present in the spinning solution, which causes degradation of the copolyamide, is made as small as possible. Dissolution of the copolyamide is conducted at a relatively low temperature ranging from room temperature to 110° C., whereby degradation of the copolyamide at the dissolving step is conveniently prevented. When the copolyamide is dissolved in the solvent, at least one member selected from hydrogen fluoride, hydrogen chloride, fluorosulfuric acid, chlorosulfuric acid, antimony pentafluoride, antimony trifluoride, boron trifluoride and phosphorus pentafluoride may be added as a dissolving assistant.

A technique according to the customary wet spinning method can be adopted for the production of fibers. More specifically, the above-mentioned spinning solution is directly spun in a coagulating medium or it is once spun into a non-coagulating medium, such as air, and is then introduced into a coagulating medium, whereby solidification is effected and fibers are obtained.

At the step of spinning the spinning solution, the spinning solution is maintained at an optional temperature in the range of from a lowest temperature, at which the solution has a flowability enough for handling, to about 110° C.. The amount of the degraded copolyamide is variable depending on the spinning time and temperature. Accordingly, the spinning solution is preferably spun at a temperature of about 70° to about 90° C.. Water is preferably used as the coagulating medium. In addition, there may be employed monohydric and polyhydric alcohols, such as methyl alcohol, ethylene glycol, glycerin and isopropanol, mixtures of water with such alcohols, and aqueous solutions of acids such as sulfuric acid, alkalis, such as ammonium hydroxide, and salts, such as calcium chloride. At the wet spinning step, the temperature of the coagulating medium is not particularly critical, but in general, it is preferred that the temperature of the coagulating medium be in the range of from $-10°$ C. to $+80°$ C.

According to one preferred embodiment of the present invention, the spinning solution of the copolyamide is spun in a non-coagulating atmosphere and the spun filament streams are solidified in a coagulating medium to form fibers. In this case, it is preferred to adopt a so-called flow-down stretch spinning method in which the coagulating medium is flowed down in the spinning direction and a tension is given to the filament streams by friction caused between the coagulating medium and the filament streams. In this flow-down stretch spinning method, a simple cylinder or a cylinder in which the sectional area is gradually reduced in the spinning direction by expanding the upper portion like a funnel or diminishing the diameter in the lower portion may be used as a stretch spinning cylinder for contacting the spun filament streams with the coagulating medium. Further, a stretch spinning cylinder having a plurality of holes formed through the side wall to change the flow rate or the like in the stretch spinning cylinder may be used. As the non-coagulating medium, gases, such as air and nitrogen, and inert liquids immiscible with the spinning solution, such as hydrocarbon liquids, can be used. Coagulating media as recited hereinbefore can be similarly employed.

Spun fibers may be subjected to various post treatments such as rinsing, neutralization, finishing and drying, before or after winding on bobbins or hanks. Water and a mixture of water with a water-miscible organic solvent can be used for washing, and the solvent or salts left in the fibers can be removed by this washing treatment. When an acid, such as hydrochloric acid or sulfuric acid, tends to be left in the fibers, a dilute aqueous solution of an alkali is sprayed on the copolyamide fibers or the copolyamide fibers are dipped in this aqueous solution, whereby undesirable adverse effects by the acid can be conveniently prevented. The so neutralized copolyamide fibers are subjected to the final water washing or finishing water washing, and then, they are dehydrated according to need. After the water washing, the copolyamide fibers are dried on a heating roll or in an air heating bath to obtain a product. It is preferred that the above-mentioned post treatments, such as rinsing, neutralization, finishing and drying, be conducted prior to the winding of the spun copolyamide fibers by introducing them into treatment zones, such as rinsing zones or baths. However, it is possible to wind copolyamide fibers on bobbins or hanks after spinning or some other post treatments. The wound copolyamide fibers are fed to post other treatment zones and subjected to the other post treatments.

In general, the copolyamide fibers of the present invention in the as-spun state have an initial modulus of elasticity of at least 400 g/d and a tensile strength of at least 16 g/d. However, if desired, these copolyamide fibers may be subjected to the heating treatment under tension. For example, they may be treated at a temperature of 200° to 600° C. under a tension of up to 5 g/d. This heat treatment under tension may be accomplished by a known drawing apparatus, including a hot plate or pin, or by using a heated fluid.

Known additives, such as antioxidants, heat stabilizers, ultraviolet absorbers, dyes fillers, flame retardants and delusterants, may be incorporated into the copolyamide fibers of the present invention according to known recipes.

The fibers of the present invention have in combination various desirable properties, such as excellent initial modulus of elasticity, high tensile strength, high knot strength, high heat resistance and good adhesiveness to various plastics, rubbers and adhesives, and they are valuably used in various industrial fields, for example, as tire cords and reinforcers for rubbery products, such as tire belts and hoses, fibrous reinforcers for various fiber-reinforced plastics and as industrial fibers for the production of ropes, filter cloths and various covers.

The present invention will now be described in detail by reference to the following Examples and Referential and Comparative Examples that by no means limit the scope of the invention.

In these Examples, the spinning of fibers from the spinning solution was conducted according to the flow-down stretch spinning method and apparatus illustrated hereinafter.

The accompanying drawing is an arrangement chart illustrating diagrammatically the spinning apparatus used in the Examples.

Referring now to the FIGURE, around a spinning cylinder 1 formed of a stainless steel of SUS 32, a jacket 3 is disposed to maintain the temperature of the spinning cylinder at a certain level by a heating medium 2. In the heating medium 2, there are disposed a sheathed wire heater 4 for heating the heating medium 2 and a temperature control mechanism TC for detecting and recording the temperature of the heating medium and controlling the temperature by adjusting the electrical input to the sheathed wire heater 4. Two stainless steel nets (not shown) having a mesh size of 625 mesh and a spinneret 5 having a thickness of 0.3 mm and 3 or 5 holes 0.08 mm in diameter are attached to the lower portion of the spinning cylinder 1. The upper portion of the spinning cylinder 1 is communicated with a nitrogen container 8 and a nitrogen gas reservoir 9 through a series of valves 6 and conduits 7, so that a predetermined pressure is applied to a spinning solution 10 in the spinning cylinder 1. A pressure gauge P is disposed in each conduit for measuring this pressure.

A spinning water tank 12 for containing therein water 11 (spinning water) as the coagulating medium is disposed below the spinneret 5, and a stretch spinning cylinder 13 (which is referred to as "spinning water cylinder" hereinafter) having the upper end opened to the interior of the spinning water tank 12 and the lower end opened below the spinning water tank 12 is disposed in the spinning water tank 12. The axial line of this spinning water cylinder is in agreement with the spinning direction of the spinneret 5. Filament streams 14 spun from the spinneret 5 are introduced into the spinning water cylinder 13 and a tension is given thereto by contact with water flowing down in the interior of the spinning water cylinder 13.

A water tank 15 is disposed to collect water flowing down from the spinning water cylinder 13, and water collected in the tank 15 is recycled to the spinning water tank 12 through a pump 16. The liquid level in the spinning water tank 12, namely the thickness of a non-coagulating medium layer present between the spinneret 5 and the liquid level, is adjusted by a liquid level adjusting mechanism 17. The fibers to which a tension has been given in the spinning water cylinder 13 are wound on a bobbin 19 through a winding guide 18.

In the Examples, physical properties of fibers were determined according to the following method.

More specifically, the tensile strength (g/d), elongation (%), initial modulus of elasticity (g/d) and knot strength (g/d) were determined according to the method of the Japanese Industrial Standard L-1069 by stretching a monofilament having a length of 25 mm at a stretching rate of 10 mm/min by using a tensile tester manufactured by Shinko Tsushin Kogyo Kabushiki Kaisha. Each value was an average value calculated from results of the tests made on ten different monofilaments.

REFERENTIAL EXAMPLE

The process for the synthesis of o-tolidine sulfone will now be described.

A three-neck flask having an inner capacity of 5-liters and equipped with a thermometer, a reflux cooler and an agitator was charged with 185 g of o-hydrazo-toluene and 2.5 Kg of ice water was added to suspend the o-hydrazo-toluene. Then, 330 g of concentrated hydrochloric acid was added to the suspension and the mixture was agitated at 20° to 30° C. for 1 hour. The temperature was elevated to about 80° C. in a warm water bath over a period of about 2 hours. At about 80° C., the mixture was agitated for 1 hour, and the reaction mixture was filtered while it was hot, to remove minute amounts of insoluble substances. When 230 g of sodium sulfate was added to the so recovered filtrate (an aqueous solution of o-tolidine hydrochloride), a light yellow brown-colored precipitate was formed. The precipitate was recovered by filtration at 35° to 40° C., washed with water and dried to obtain 204 g of o-tolidine sulfate.

A four-neck flask having an inner capacity of 1 liter and equipped with a thermometer, a reflux cooler and an agitator was charged with 300 g of concentrated sulfuric acid and 400 g of 50% fuming sulfuric acid, and while the inner temperature of the flask was maintained at 29° to 33° C. by using a water bath containing floating ice, 100 g of o-tolidine sulfate was added little by little to the sulfuric acid over a period of about 1 hour. After completion of the addition, agitation was conducted at this temperature for 0.5 hour to obtain a homogeneous brown solution as the liquid reaction mixture. The solution was heated to 60° C. over a period of 1 hour by using warm water bath and this temperature was maintained for about 1 hour. Then, the temperature was further elevated and agitation was conducted at 80° to 85° C. for 1.5 hours. The reaction mixture was cooled and poured into 3.5 Kg of ice water, and the precipitated light yellow brown-colored precipitate was recovered by filtration, and 1.5 l of water was added to the precipitate and a 40% by weight aqueous solution of sodium hydroxide was added to render the mixture weakly alkaline. The mixture was heated at 60° to 70° C. and the formed yellowish brown precipitate was recovered by filtration, washed with water and poured into 4 l of water. Then, 800 g of concentrated hydrochloric acid was added and the temperature was elevated to 50° to 60° C. to dissolve the precipitate. Minute amounts of insoluble substances were removed by filtration, and small amounts of active carbon and hydrosulfite were added to the recovered reddish brown filtrate. The mixture was agitated for 1 hour to effect decoloration. Active carbon was removed by filtration and a 40% by weight aqueous solution of sodium hydroxide was added to the recovered light yellow filtrate in a nitrogen gas atmosphere to make the solution weakly alkaline. By addition of the aqueous solution of sodium hydroxide, a yellow precipitate was formed. This yellow precipitate was recovered by filtration, washed with water sufficiently, then washed with 1 l of ethanol and dried at 110° to 130° C. under reduced pressure to obtain 69.5 g of a purified product of o-tolidine sulfone. Elementary analysis values of this purified product were as follows:

Found values: C=60.80%, H=5.11%, N=10.38%, S=12.74%. Calculated values: C=61.29%, H=5.14%, N=10.21%, S=11.69%.

EXAMPLE 1

Preparation of a copolyamide containing 10 mole % of the units (A) in the diamine component will now be described.

Starting compounds used other than o-tolidine sulfone were purified in the following manners.

(i) Purification of Terephthaloyl Chloride:

Commercially available terephthaloyl chloride (manufactured by Tokyo Kasei, EP grade) was distilled under a reduced pressure of 8 mm Hg at 125° C. by using a Vigoureux distillation head.

(ii) Purification of p-Phenylene Diamine:

Commercially available p-phenylene diamine (manufactured by Yoneyama Yakuhin, EP grade) was distilled under a reduced pressure of 30 mm Hg at 180° C. by using a Vigoureaux distillation head.

(iii) Purification of N-Methyl Pyrrolidone (NMP) and N,N-Dimethylacetamide (DMA):

Each of these solvents was purified by separating 15% of the initial fraction by distillation using a Widmer distillation column, collecting the medium fraction and adding calcium hydride to the medium fraction to effect dehydration.

A 4-neck separable flask equipped with an agitator, a nitrogen-introducing opening, a calcium chloride-introducing pipe and a starting compound-introducing opening was sufficiently dried and 690 ml of DMA, 690 ml of NMP, and 22.2 g of lithium chloride were charged in the flask. The mixture was agitated in a nitrogen gas atmosphere at room temperature to form a solution. Then, 17.13 g of p-phenylene diamine and 4.82 g of o-tolidine sulfone were dissolved in the solution. After agitation was applied for about 0.5 hours to the resultant solution under ice cooling, 35.74 g of terephthaloyl chloride was admixed through the starting compound-introducing opening to the solution, and agitation was applied to the admixture even after the completion of the addition of terephthaloyl chloride.

As the reaction progressed the liquid reaction mixture became viscous, and precipitation of a polymer in the form of yellow rubber chips was observed. When the reaction was conducted for 2 hours, the ice cooling bath was taken out and the reaction product mixture was poured in a large quantity of water and the resulting copolyamide was washed under pulverization by means of a household mixer. The copolyamide was collected by filtration, dipped in methanol overnight, collected by filtration and then dried.

The amount of the thus obtained copolyamide was 43.9 g (the yield being 98%) and the inherent viscosity ($\eta$ inh) was 4.93 dl/g.

The decomposition temperature of the copolyamide was 455° C. In this specification, by the term "decomposition temperature" is meant a temperature causing 2% weight loss when 10 mg of a sample is taken and the temperature is elevated at a rate of 5° C. per minute while keeping the sample in air. The measurement of the decomposition temperature was conducted in this Example and subsequent Examples by using a standard type of Differential Thermobalance TG-DSC (manufactured by Rigaku Denki Kabushiki Kaisha). The thus determined decomposition temperature will be referred to as "Td" hereinafter.

Preparation of fibers from the thus prepared copolyamide will now be described.

The thus obtained copolyamide containing 10 mole % of the units (A) in the diamine component was dissolved in 99.8% sulfuric acid at 85° C. to form a spinning solution (dope) having a polymer concentration of 20% by weight, and the spinning solution was spun downwardly in the vertical direction through a spinneret having 5 holes 0.08 mm in diameter, passed through an air layer having a length of about 10 mm, introduced into water maintained at about 0° C., passed through a water spinning cylinder formed of a glass pipe (6 mm in diameter and 15 cm in length) in which water was flowed down, and wound on a bobbin at a predetermined speed.

Experimental conditions adopted at the above stretch spinning were as follows:

Dope temperature: 85° C.
Extrusion pressure: 37 Kg/cm$^2$
Extrusion speed: 27 m/min
Spinning water speed: 70 m/min
Winding speed: 118 m/min
Spin stretch factor: 4.3

The filaments wound on the bobbin were washed in the wound state with distilled water containing a small amount of sodium bicarbonate and dried at room temperature. Properties of the dried filaments are as follows:

Fineness: 3.8 denier
Tensile strength: 22.9 g/d
Ultimate elongation: 5.5%
Initial modulus of elasticity: 468 g/d
Knot strength: 6.6 g/d The filaments were dipped in distilled water at about 80° C. for 6 hours dried and then heat-treated by running them through a quartz pipe in a nitrogen gas atmosphere, which was placed in a tubular electric furnace having a length of 30 cm, under conditions of a temperature of 500° C., a tension of 0.5 g/d and a treatment time of 6.9 seconds. Properties of obtained fibers are shown below.

Fineness: 3.6 denier
Tensile strength: 31.2 g/d
Ultimate elongation: 3.3%
Initial modulus of elasticity: 875 g/d
Knot strength: 4.4 g/d

EXAMPLE 2

The reaction was carried out under the same conditions as in Example 1 except that 650 ml of DMA, 650 ml of NMP, 21.9 g of lithium chloride, 13.47 g of p-phenylene diamine, 8.54 g of o-tolidine sulfone and 31.64 g of terephthaloyl chloride were used, to obtain a yellowish white copolyamide containing 20 mole % of the units (A) in the diamine component. The amount of the copolyamide obtained was 42.3 g and the copolyamide was characterized by an inherent viscosity ($\eta$ inh) of 5.70 dl/g and a decomposition temperature (Td) of 437° C.

Spun filaments were prepared from the thus obtained copolyamide under the same conditions as described in Example 1, except that the copolymer concentration in the spinning dope was changed to 22% by weight, the extrusion pressure was changed to 60 Kg/cm$^2$ and the extrusion speed was changed to 30 m/min (accordingly, the spin stretch factor was changed to 4.0).

The dried filaments had the following properties:

Fineness: 4.1 denier
Tensile strength: 24.1 g/d
Ultimate elongation: 5.3%
Initial modulus of elasticity: 490 g/d
Knot strength: 7.0 g/d The filaments were heat-treated under the same conditions as described in Example 1. The heat treatment conditions and properties of the resulting fibers are shown in Table 1.

TABLE 1

| Heat Treatment Conditions | | | | Properties of Fibers | | | |
|---|---|---|---|---|---|---|---|
| Temperature (°C.) | Tension (g/d) | Time (sec.) | Fineness (denier) | Tensile Strength (g/d) | Ultimate elongation (%) | Initial Modulus of Elasticity (g/d) | Knot strength (g/d) |
| 300 | 0.5 | 6.9 | 3.7 | 27.2 | 4.1 | 619 | 6.8 |
| 350 | 0.5 | 6.9 | 3.4 | 29.1 | 3.7 | 718 | 6.5 |
| 400 | 0.5 | 6.9 | 3.6 | 30.6 | 3.7 | 786 | 6.0 |
| 450 | 0.5 | 6.9 | 3.9 | 34.7 | 3.9 | 802 | 5.3 |
| 500 | 0.5 | 6.9 | 3.6 | 35.0 | 3.7 | 807 | 6.0 |

EXAMPLE 3

The reaction was carried out under the same conditions as in Example 1 except that 670 ml of DMA, 670 ml of NMP, 20.4 g of lithium chloride, 11.62 g of p-phenylene diamine, 12.63 g of o-tolidine sulfone and 31.18 g of terephthaloyl chloride were used, to obtain a yellowish white copolyamide containing 30 mole % of the units (A) in the diamine component. The amount of the copolyamide obtained was 44.5 g, and the copolyamide was characterized by an inherent viscosity ($\eta$ inh) of 5.16 dl/g and a decomposition temperature (Td) of 442° C.

Spun filaments were prepared from the thus obtained copolyamide under the same condition as in Example 1 except the extrusion pressure, extrusion speed, winding speed and the spin stretch factor were changed as follows:

Extrusion pressure: 50 kg/cm$^2$
Extrusion speed: 37 m/min
Winding speed: 118 m/min
Spin stretch factor: 3.2

The dried spun filaments had the following properties:

Fineness: 5.1 denier
Tensile strength: 20.6 g/d
Ultimate elongation: 5.4%
Initial modulus of elasticity: 434 g/d
Knot strength: 7.6 g/d The spun filaments were heat-treated under the same conditions as described in Example 1. The properties of the obtained fibers are shown below.

Fineness: 4.8 denier
Tensile strength: 27.8 g/d
Ultimate elongation: 3.5%
Initial modulus of elasticity: 736 g/d
Knot strength: 4.7 g/d

EXAMPLE 4

A four-necked separable flask provided with an agitator and inlets for charging nitrogen gas, calcium chloride and starting compounds, was completely dried. The flask was charged with 190 ml of NMP. In this flask, 12.98 g of p-phenylene diamine and 8.20 g of o-tolidine sulfone were dissolved in NMP, while flowing nitrogen gas through the flask. Next, a white paste mixture of 33.3 g of CaCl$_2$ and 65 ml of NMP was placed into the flask while stirring the resultant mixture so as to suspend CaCl$_2$ particles in the mixture. The stirring operation was continued for 30 minutes while cooling the mixture to a temperature of from −5° to −10° C. by using a coolant consisting of acetone, water and dry ice. Thereafter, 30.45 g of terephthaloyl chloride were admixed to the cooled mixture while stirring the admixture. It was observed that the reaction mixture became viscous and, finally, was converted into a rubber like solid. Two hours after the addition of the terephthaloyl chloride, the resultant product was treated in the same manner as that described in Example 1.

40.7 g of a copolyamide was obtained in a yield of 99.7%. The copolyamide exhibited an inherent viscosity of 5.00 dl/g.

The copolyamide was converted into filaments by the same method as that described in Example 1, except that the extrusion pressure was 50 kg/cm², the extrusion speed was 38 m/min, the winding speed was 121 m/min and the spin stretch factor was 3.2.

The properties of the resultant filaments were as follows.

Fineness: 5.8 denier
Tensile strength: 17.0 g/d
Ultimate elongation: 4.6%
Initial modulus of elasticity: 532 g/d
Knot strength: 4.9 g/d The filaments were heat-treated in the same manner as that described in Example 1, except that the treating temperature was 450° C. The heat-treated filaments exhibited the following properties.

Fineness: 5.0 denier
Tensile strength: 25.6 g/d
Ultimate elongation: 3.0%
Initial Modulus of elasticity: 878 g/d
Knot strength: 4.4 g/d

COMPARATIVE EXAMPLE 1

The reaction was carried out under the same conditions as described in Example 1 except that 85 ml of DMA, 85 ml of NMP, 1.9 g of lithium chloride, 4.02 g of o-tolidine sulfone and 2.99 g of terephthaloyl chloride were used, to obtain 6.3 g of a light yellow poly(o-tolidine sulfone terephthalamide) characterized by an inherent viscosity (η inh) of 4.37 dl/g and a decomposition temperature (Td) of 439° C. The thus obtained copolyamide was dissolved in 99.8% sulfuric acid at 85° C. to form a dope having a polymer concentration of 20% by weight. The dope was passed through a spinneret having 5 holes 0.08 mm in diameter and extruded downwardly in the vertical direction at a dope temperature of 85° C. and an extrusion pressure of 55 kg/cm². The extrudate was cut at the top end of the nozzle and continuous filaments could not be obtained.

COMPARATIVE EXAMPLE 2

The reaction was carried out under the same conditions as described in Example 1 except that 267 ml of hexamethyl phosphoramide (HMPA), 533 ml of NMP, 26.55 g of p-phenylene diamine and 49.89 g of terephthaloyl chloride were used, to obtain 58.0 g of yellowish white poly(p-phenylene terephthalamide) characterized by an inherent viscosity (η inh) of 6.30 dl/g and a decomposition temperature (Td) of 482° C. This polyamide was dissolved in 99.8% sulfuric acid at 85° C. to form a dope having a polymer concentration of 20% by weight. Filaments were prepared under the same conditions as described in Example 1 except that extrusion pressure, extrusion speed, winding speed and spin stretch factor were changed to 25 kg/cm², 26 m/min, 118 m/min and 4.6, respectively.

Properties of the dried filaments were as follows:

Fineness: 3.5 denier
Tensile strength: 26.1 g/d
Ultimate elongation: 4.4%
Initial modulus of elasticity: 555 g/d
Knot strength: 5.8 g/d The spun filaments were heat-treated under the same conditions as described in Example 1. The properties of the obtained fibers are shown below.

Fineness: 3.4 denier
Tensile strength: 20.3 g/d
Ultimate elongation: 2.2%
Initial modulus of elasticity: 876 g/d
Knot strength: 1.5 g/d

We claim:

1. A fiber composed of a high-molecular-weight copolyamide consisting essentially of units (A) represented by the following formulae:

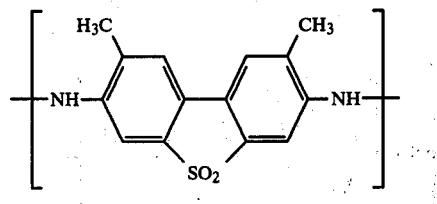

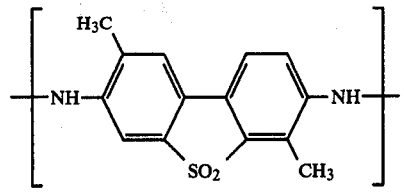

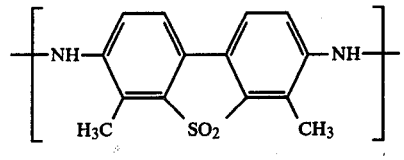

units (B) represented by the following formula:

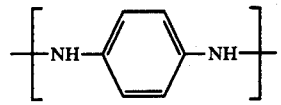

and units (C) represented by the following formula:

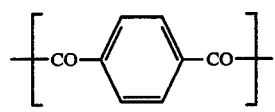

in which units (A), (B) and (C) are present in such amounts that the sum of amounts of units (A) and (B) is substantially equimolar to the amount of the units (C) and the molar ratio of the units (A) to the units (B) is in the range of from 10/90 to 50/50.

2. A fiber as claimed in claim 1, wherein said fiber has an initial modulus of elasticity of 400 g/d or more and a tensile strength of from 16 g/d or more.

3. A fiber as claimed in claim 1, wherein the inherent viscosity of said copolyamide is in the range of from 2.0 to 10 dl/g as measured in 96% sulfuric acid at a polymer concentration of 0.5 g/dl and a temperature of 30° C.

4. A fiber as claimed in claim 1, wherein the molar ratio of the units (A) to the units (B) is in the range of from 15/85 to 30/70.

5. A high-molecular-weight fiber-forming copolyamide consisting essentially of units (A) represented by the following formulae:

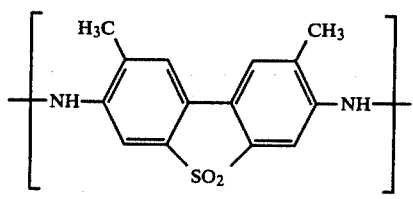

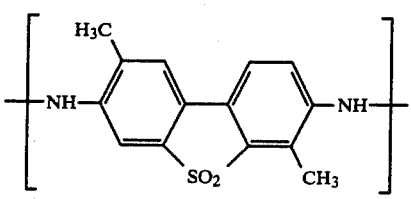

units (B) represented by the following formula:

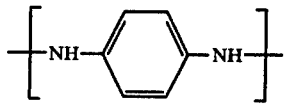

and units (C) represented by the following formula:

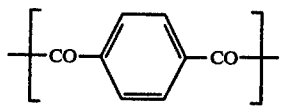

in which the units (A), (B) and (C) are present in such amounts that the sum of amounts of units (A) and (B) is substantially equimolar to the amount of the units (C) and the molar ratio of the units (A) to the units (B) is in the range of from 10/90 to 50/50.

* * * * *